United States Patent
Mizokami

(10) Patent No.: US 11,398,003 B2
(45) Date of Patent: Jul. 26, 2022

(54) MACHINE LEARNING APPARATUS, ROBOT SYSTEM, AND MACHINE LEARNING METHOD OF LEARNING STATE OF CABLE

(71) Applicant: FANUC CORPORATION, Yamanashi (JP)

(72) Inventor: Shinji Mizokami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 245 days.

(21) Appl. No.: 16/886,778

(22) Filed: May 29, 2020

(65) Prior Publication Data

US 2020/0380634 A1 Dec. 3, 2020

(30) Foreign Application Priority Data

May 31, 2019 (JP) .............................. JP2019-102816

(51) Int. Cl.
*G06T 1/00* (2006.01)
*G06T 7/00* (2017.01)
*G06N 5/04* (2006.01)
*G06N 20/00* (2019.01)

(52) U.S. Cl.
CPC ............ *G06T 1/0014* (2013.01); *G06N 5/04* (2013.01); *G06N 20/00* (2019.01); *G06T 7/0004* (2013.01); *G06T 2207/20081* (2013.01); *G06T 2207/30108* (2013.01)

(58) Field of Classification Search
CPC ..... G06V 10/94; G06V 10/751; G06K 9/6262
See application file for complete search history.

(56) References Cited

U.S. PATENT DOCUMENTS

| 7,260,430 | B2 * | 8/2007 | Wu | G16Z 99/00 |
| | | | | 600/545 |
| 8,855,812 | B2 * | 10/2014 | Kapoor | B25J 9/1666 |
| | | | | 706/14 |
| 10,639,793 | B2 * | 5/2020 | Williams | G05D 1/0274 |
| 10,845,893 | B2 * | 11/2020 | Lee | G06F 3/0346 |
| 10,974,394 | B2 * | 4/2021 | Benaim | B25J 9/163 |
| 11,045,949 | B2 * | 6/2021 | Vijayanarasimhan | |
| | | | | G06N 3/084 |

FOREIGN PATENT DOCUMENTS

JP         2017226000 A      12/2017

* cited by examiner

*Primary Examiner* — Yosef Kassa
(74) *Attorney, Agent, or Firm* — Hauptman Ham, LLP

(57) ABSTRACT

A machine learning apparatus that can quantitatively and accurately evaluate the state of a cable in a robot. A machine learning apparatus for learning a state of a cable mounted in a robot includes a learning data acquisition section that acquires, as a learning data set, image data of the cable captured by a camera while the robot performs a predetermined operation, and data representing a state of the cable while the robot performs the predetermined operation, and a learning section that generates a learning model representing a correlation between the image data and the state of the cable, using the learning data set.

10 Claims, 16 Drawing Sheets

MACHINE LEARNING APPARATUS, ROBOT SYSTEM, AND MACHINE LEARNING METHOD OF LEARNING STATE OF CABLE

RELATED APPLICATIONS

The present application claims priority to Japanese Application Number 2019-102816, filed May 31, 2019, the disclosure of which is hereby incorporated by reference herein in its entirety.

BACKGROUND OF THE INVENTION

1. Field of the Invention

The invention relates to a machine learning apparatus, a robot system, and a machine learning method for learning the state of a cable mounted in a robot.

2. Description of the Related Art

An apparatus for monitoring a cable mounted in a robot is known (see, e.g., Japanese Unexamined Patent Publication (Kokai) No. 2017-226000). A demand has conventionally arisen for a technique for quantitatively and accurately evaluating the state of a cable in a robot.

SUMMARY OF INVENTION

In an aspect of the disclosure, a machine learning apparatus configured to learn a state of a cable provided at a robot, includes a learning data acquisition section configured to acquire, as a learning data set, image data of the cable imaged by a camera while the robot performs a predetermined operation, and data indicating a state of the cable while the robot performs the predetermined operation; and a learning section configured to generate a learning model representing a correlation between the image data and the state of the cable, using the learning data set.

In another aspect of the disclosure, a machine learning method of learning a state of a cable provided at a robot includes, by a processor, acquiring, as a learning data set, image data of the cable imaged by a camera while the robot performs a predetermined operation, and data indicating a state of the cable while the robot performs the predetermined operation; and generating a learning model representing a correlation between the image data and the state of the cable, using the learning data set.

According to the disclosure, a model quantitatively representing a correlation between image data of a cable and the state of the cable can be easily and accurately obtained.

DETAILED DESCRIPTION

Figure 1:
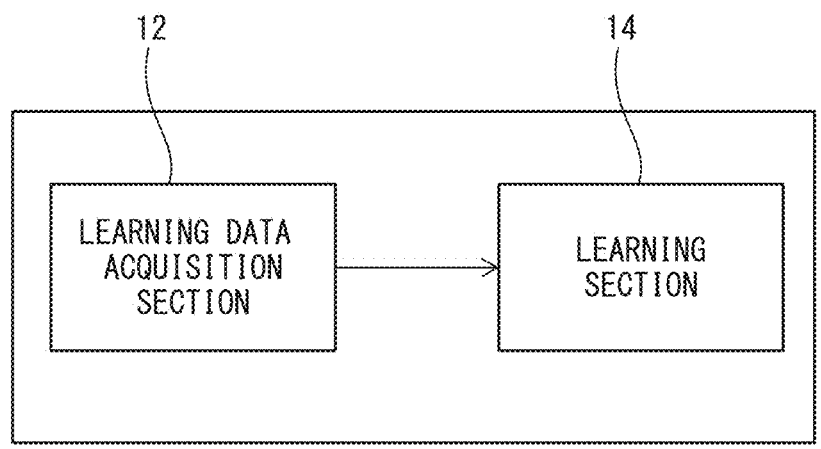
FIG. 1 is a block diagram illustrating a machine learning apparatus according to one embodiment.

Embodiments of the disclosure will be described in detail below with reference to the drawings. Note that, in various embodiments to be set forth below, similar elements are assigned the same reference numerals, and repetitive descriptions thereof will be omitted. First, a machine learning apparatus 10 according to an embodiment will be described with reference to FIG. 1. The machine learning apparatus 10 may be comprised of a computer including e.g. a processor (e.g., CPU, GPU), a storage (e.g., ROM, RAM), and an input device (e.g., a keyboard, mouse, or touch panel), or comprised of software such as a learning algorithm executed by a computer.

The machine learning apparatus 10 is configured to learn a state (e.g., a normal state or an abnormal state) of a cable 22 provided at a robot 20 described later. Below, with reference to FIG. 2, the robot 20 will be described. In this embodiment, the robot 20 is a vertical articulated robot, and includes a base 24, a rotating body 26, a lower arm 28, an upper arm 30, a wrist 32, and a cable 22.

The base 24 is fixed on a floor of a work cell. The rotating body 26 is mounted at the base 24 so as to be rotatable about a vertical axis. The lower arm 28 is mounted at the rotating body 26 so as to be rotatable about a horizontal axis. The upper arm 30 is rotatably mounted at a distal end of the lower arm 28. The wrist 32 is rotatably mounted at a distal end of the upper arm 30.

An end effector (e.g., a welding torch, a robot hand, a tool, or a paint applicator. Not illustrated) for performing a predetermined work (e.g., welding, workpiece handling, machining, or painting) is detachably attached to a distal end of the wrist 32. The robot 20 includes therein servomotors (not illustrated) for driving movable elements (i.e., the rotating body 26, the lower arm 28, the upper arm 30, and the wrist 32) of the robot 20.

The cable 22 is laid on each movable element of the robot 20, using restraint tools 34. Each restraint tool 34 is fixed on the movable element of the robot 20 at a predetermined position, and defines a hole for receiving the cable 22 therein. The cable 22 is inserted into the hole of each restraint tool 34 and restrained thereby. The fixing positions of the restraint tools 34 in the robot 20 are determined for each type of robot 20.

Figure 3:
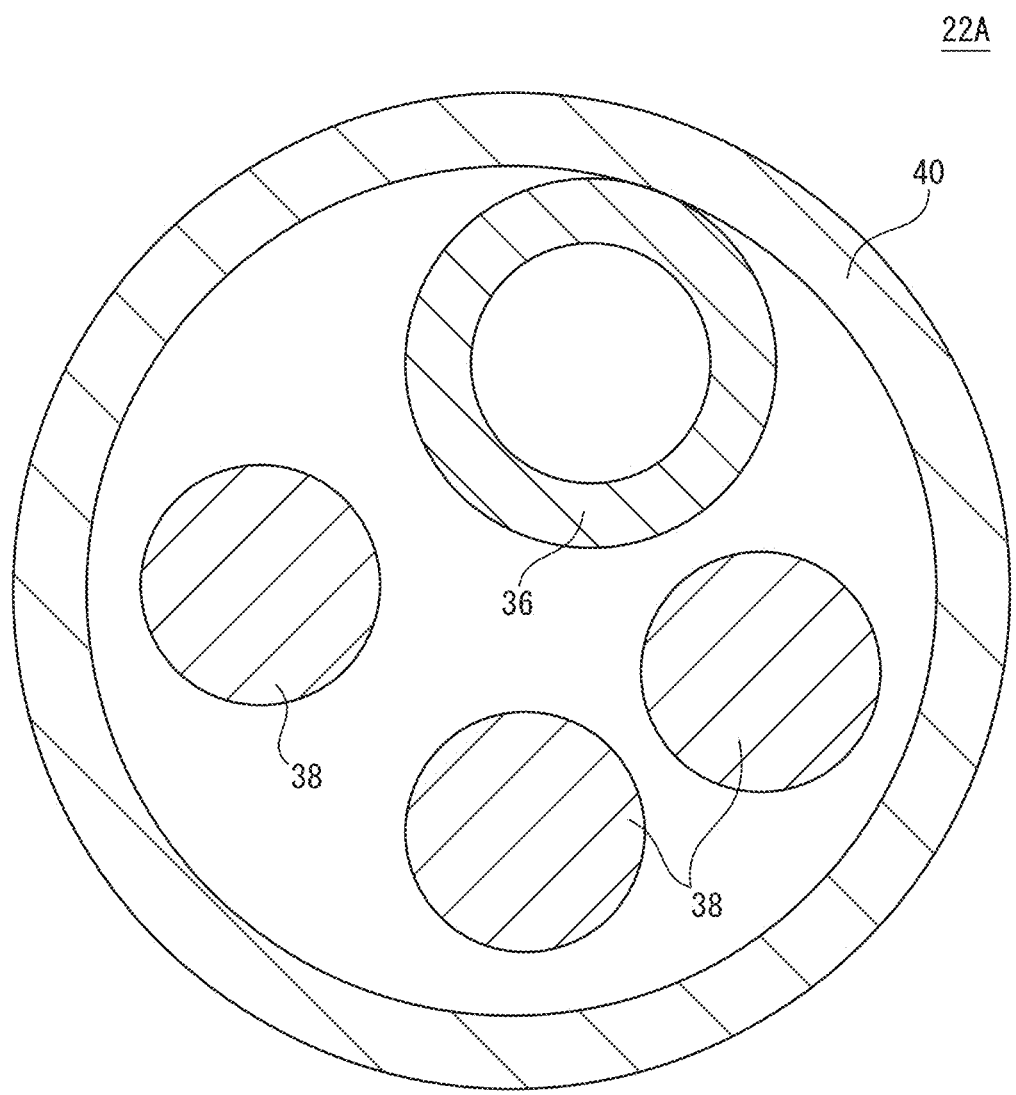
FIG. 3 is a sectional view illustrating a cable according to one embodiment.

Various types of cables 22 are used depending on the work executed by the robot 20. FIG. 3 illustrates a sectional view of a cable 22A of a first type. The cable 22A includes a feed pipe 36, transmission lines 38, and a sheath 40. The feed pipe 36 is a cylindrical member extending along an axis of the sheath 40. The feed pipe 36 feeds a fluid or a line used for the work of the robot 20.

As an example, when the welding torch is attached to the wrist 32 as the end effector and the robot 20 carries out welding on a workpiece, the feed pipe 36 feeds an assist gas as the fluid to the welding torch. Alternatively, the feed pipe 36 accommodates a welding wire as the wire member inside thereof, and feeds it to the welding torch. As another example, when the tool is attached to the wrist 32 and the robot 20 carries out machining on a workpiece, the feed pipe 36 feeds a compressed gas as the fluid to the tool.

The transmission lines 38 each transmits an electrical signal. For example, the transmission lines 38 transmit the signals to the servomotors built in the robot 20, or the end effector attached to the wrist 32. In the cable 22A, the feed pipe 36 and the transmission lines 38 are randomly arranged in the sheath 40.

Figure 4:
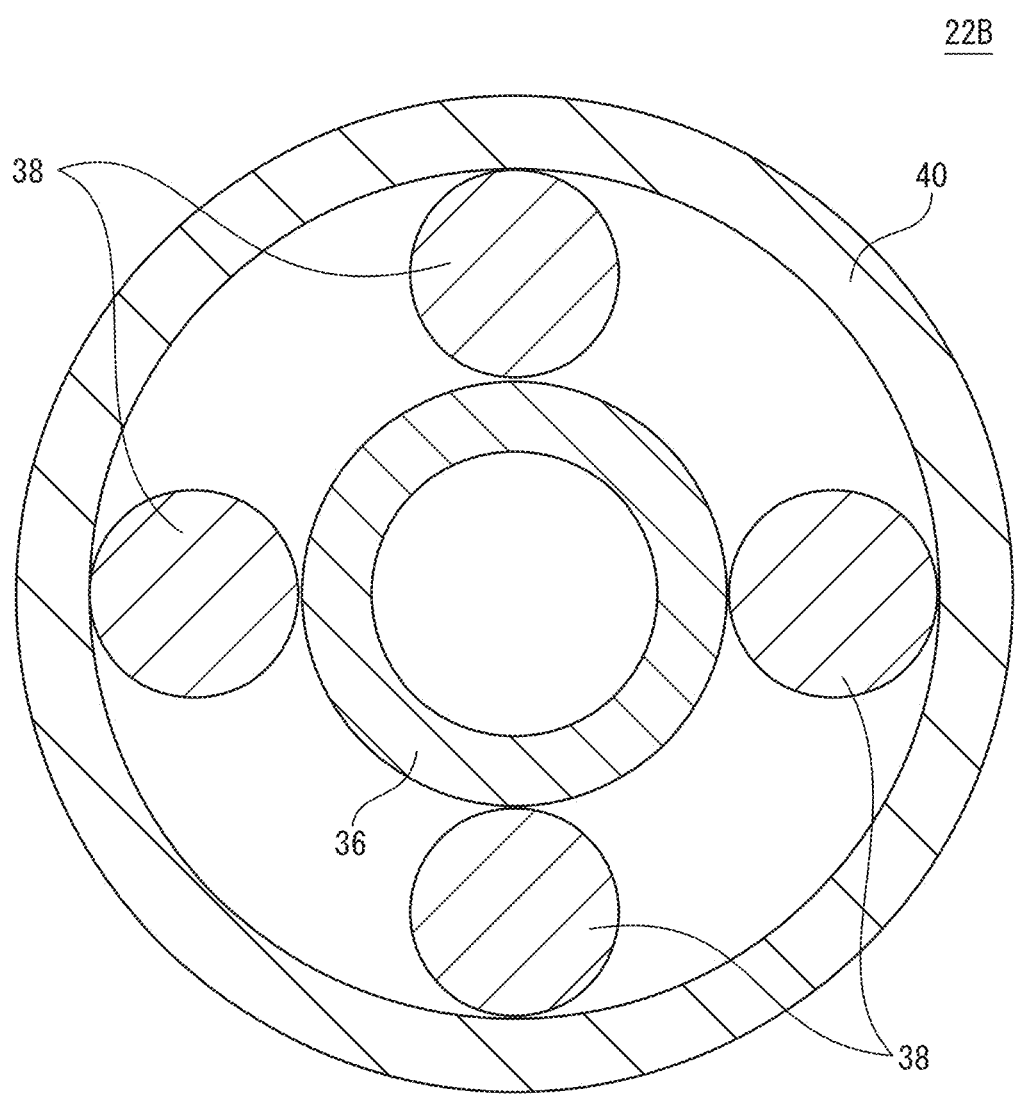
FIG. 4 is a sectional view illustrating a cable according to another embodiment.

FIG. 4 illustrates a sectional view of a cable 22B of a second type. The cable 22B includes the feed pipe 36, a total of four transmission lines 38, and the sheath 40, wherein the transmission lines 38 are arranged at an outer circumferential-side of the feed pipe 36 so as to align in the circumferential direction of the feed pipe 36 at substantially equal intervals. Thus, in the cable 22B, the feed pipe 36, the transmission lines 38, and the sheath 40 are arranged concentrically.

Figure 5:
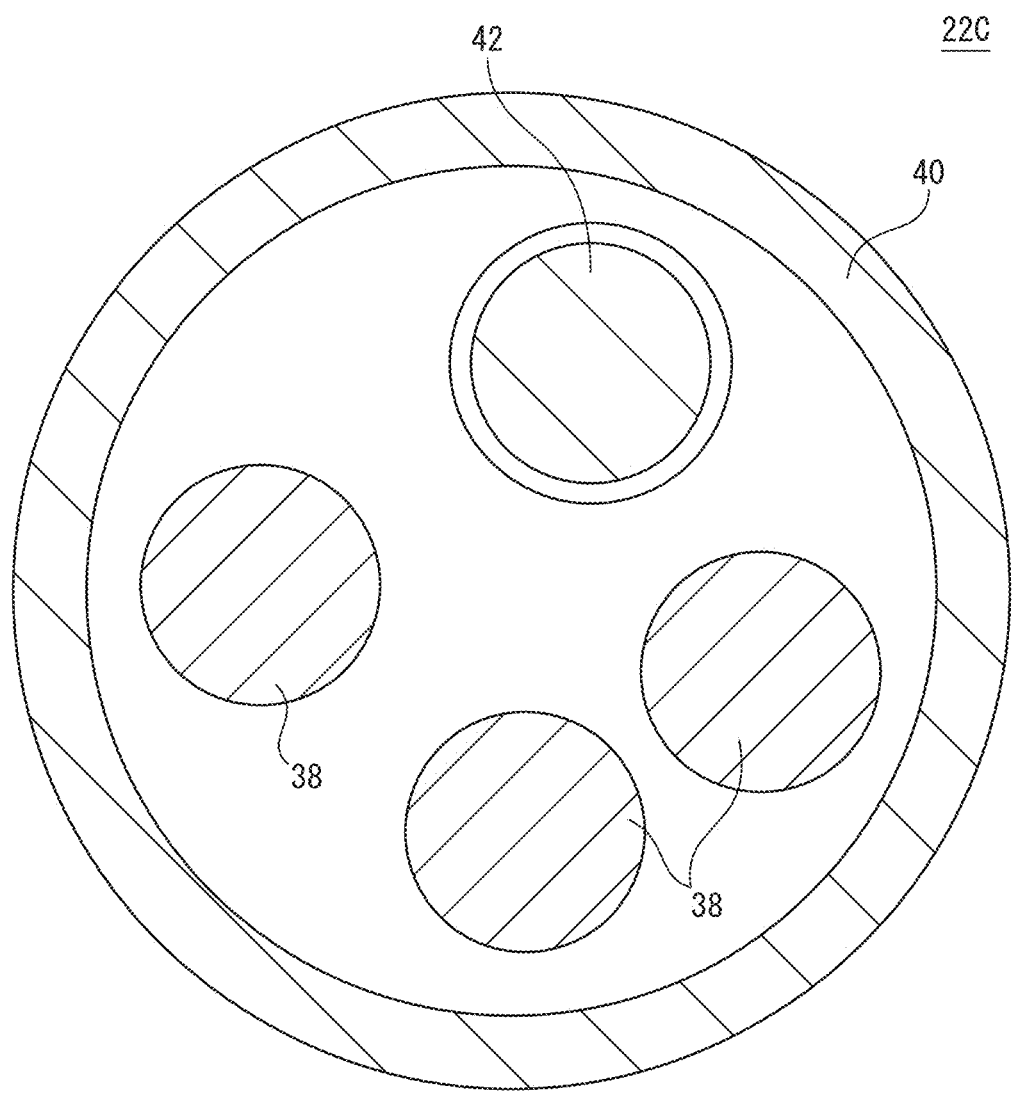
FIG. 5 is a sectional view illustrating a cable according to still another embodiment.

FIG. 5 illustrates a sectional view of a cable 22C of a third type. The cable 22B includes a total of three transmission lines 38, an optical fiber 42, and the sheath 40. As an example, when the laser machining head is attached to the wrist 32 as the end effector and the robot 20 carries out laser machining on a workpiece, the optical fiber 42 propagates a laser beam therethrough to guide the laser beam to the laser machining head. In the cable 22C, the transmission lines 38 and the optical fiber 42 are randomly arranged in the sheath 40.

As described above, in the robot 20, a plurality of types of cables 22 (e.g., the cables 22A, 22B, and 22C) may be used. The types of cables 22 are classified depending on e.g. the type of the wire members (the feed pipe 36, the transmission line 38, and the optical fiber 42) to be used, the number of the wire members, the arrangement of the wire members in the sheath 40, the material of the sheath 40, and the positions of binding wires for binding the wire members in the sheath 40 at predetermined intervals.

Figure 2:
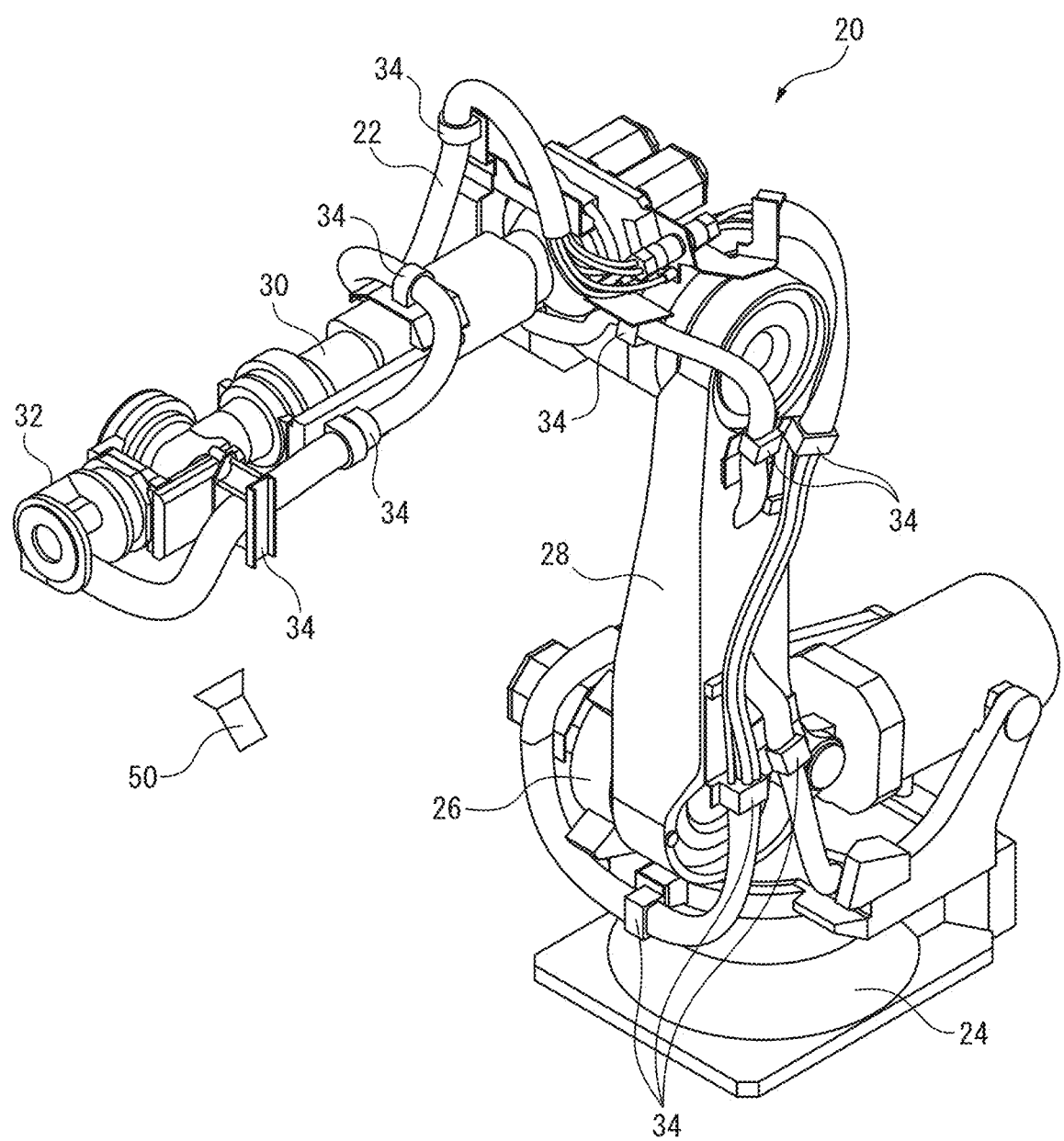
FIG. 2 is a perspective view illustrating a robot according to one embodiment.

Referring to FIG. 2, a camera 50 is provided for imaging the cable 22. The camera 50 images the cable 22 while the robot 20 performs a predetermined operation. For example, the "predetermined operation" may be a series of operations of the robot 20 when the robot 20 carries out a work (e.g., welding, workpiece handling, machining, or painting). When performing the predetermined operation, the robot 20 operates each movable element (the rotating body 26, the lower arm 28, the upper arm 30, the wrist 32) in accordance with a robot program created in advance, in order to perform the series of operations for the work.

Alternatively, the "predetermined operation" may be an operation of rotating a first element (i.e., the rotating body 26, the lower arm 28, the upper arm 30, or the wrist 32) of the robot 20 with respect to a second element (the base 24, the rotating body 26, the lower arm 28, or the upper arm 30) of the robot 20 between a first position and a second position that are predetermined.

The camera 50 is arranged so as to image a predetermined position of the cable 22 along a predetermined visual-line direction while the robot 20 performs the predetermined operation. The camera 50 may be fixed at a position different from the robot 20, or may be fixed on an element (the base 24, the rotating body 26, the lower arm 28, or the upper arm 30) of the robot 20. In this embodiment, a case will be described as an example in which the camera 50 is arranged to image the cable 22 at a position in the vicinity of the connection between the wrist 32 and the upper arm 30.

When the wrist 32 rotates with respect to the upper arm 30 while the robot 20 performs the predetermined operation, the cable 22 is bent at a position in the vicinity of the connection between the wrist 32 and the upper arm 30. FIGS. 6 to 9 schematically illustrate bending states of the cable 22 during the predetermined operation. Assume that the wrist 32 rotates with respect to the upper arm 30 from an initial position illustrated in FIG. 6 to a first reference position illustrated in FIGS. 7 to 9 during the predetermined operation.

Figure 6:
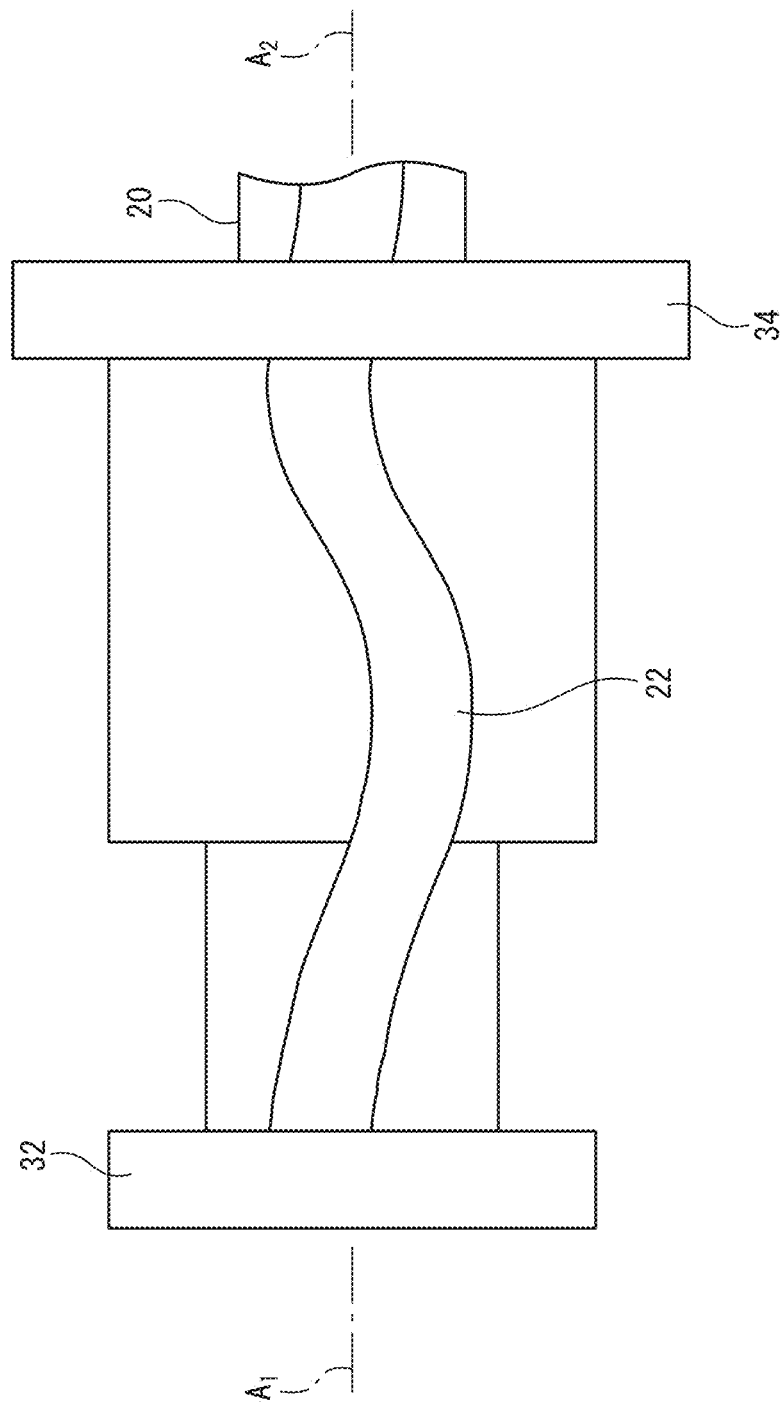
FIG. 6 is an enlarged view illustrating the connection between a wrist and an upper arm, illustrated in FIG. 2, as enlarged.
Figure 7:
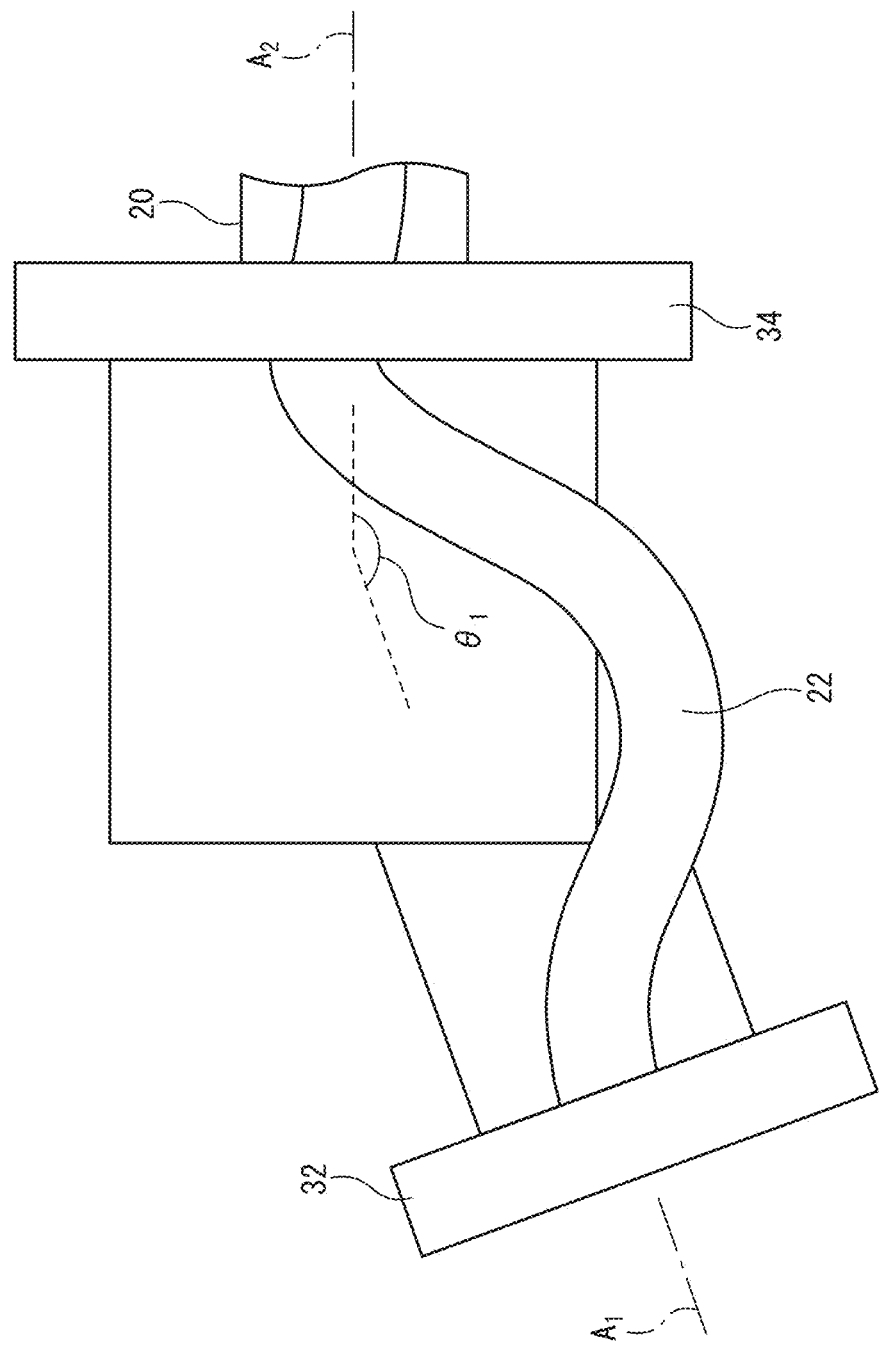
FIG. 7 is a view for explaining a state in which the cable is bent while the robot performs a predetermined operation.
Figure 8:
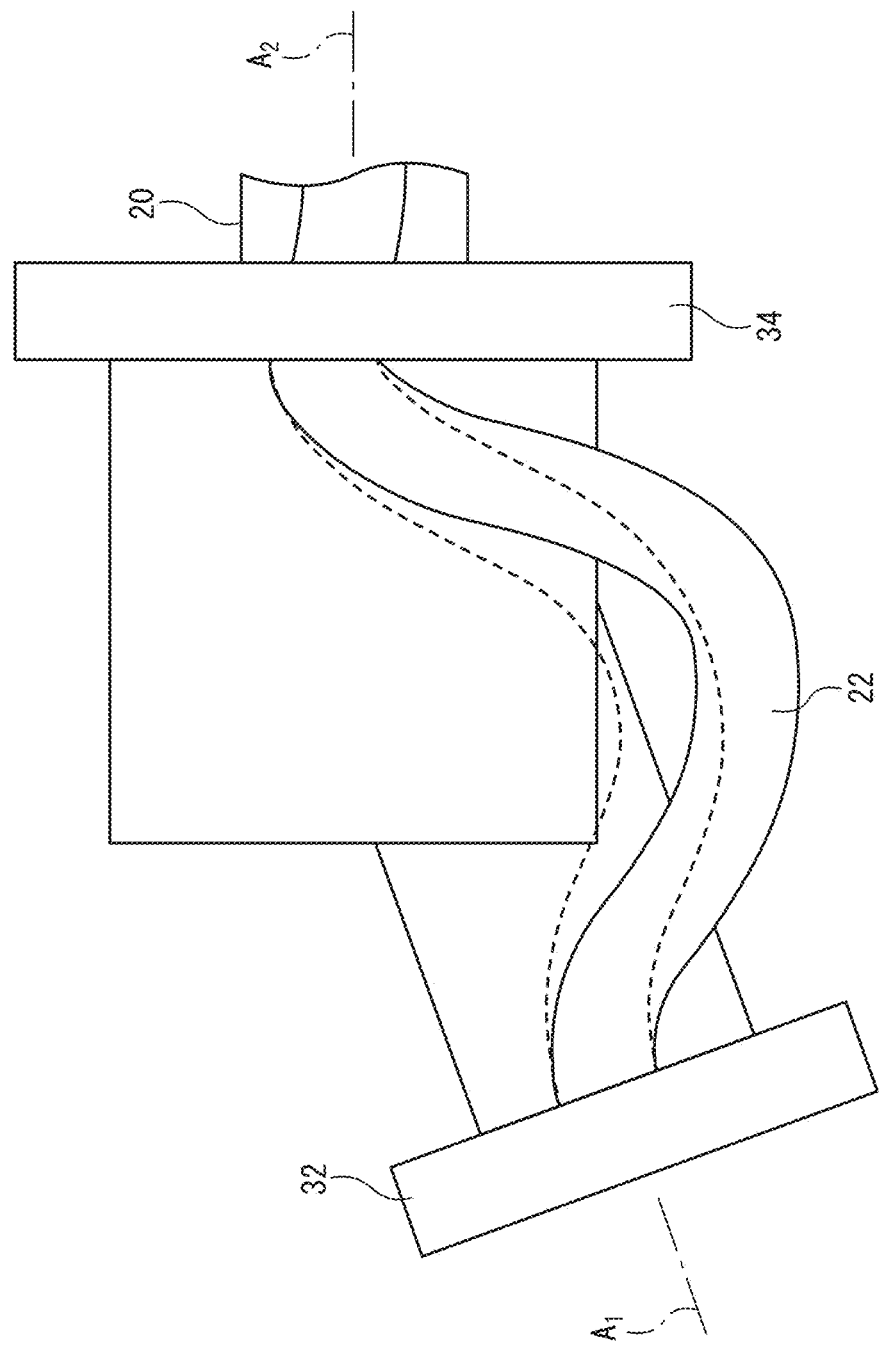
FIG. 8 is a view for explaining another state in which the cable is bent while the robot performs the predetermined operation.
Figure 9:
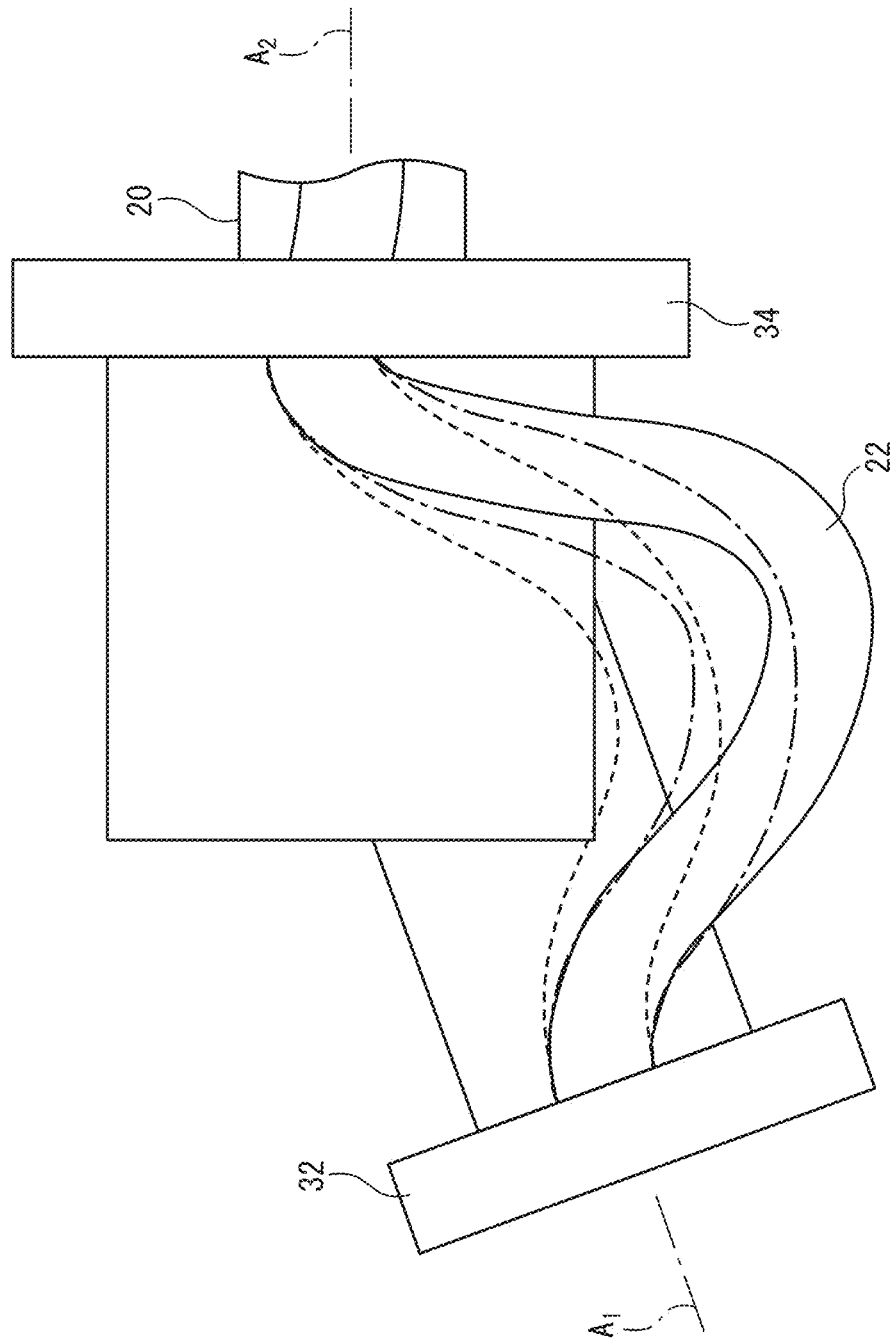
FIG. 9 is a view for explaining still another state in which the cable is bent while the robot performs the predetermined operation.

In the initial position illustrated in FIG. 6, an axis $A_1$ of the wrist 32 and an axis $A_2$ of the upper arm 30 are substantially parallel to each other. On the other hand, in the first reference position illustrated in FIGS. 7 to 9, the axis $A_1$ of the wrist 32 is inclined with respect to the axis $A_2$ of the upper arm 30 by an angle $\theta_1$. FIGS. 7 to 9 illustrate exemplary bending states of the cable 22 when the wrist 32 is arranged at the first reference position relative to the upper arm 30 during the predetermined operation. For the sake of a comparison, the cable illustrated in FIG. 7 is superimposed on FIG. 8 in the form of a dotted line, and the cables illustrated in FIGS. 7 and 8 are superimposed on FIG. 9 in the form of a dotted line and an alternate long and short dashed line, respectively.

Due to an error of the restraint positions of the cable 22 or a dimensional error of an element of the robot 20 for example, the degree of bending of the cable 22 of the same type when the wrist 32 is arranged at the first reference position relative to the upper arm 30 may differ, as illustrated in FIGS. 7 to 9.

For example, the degree of bending of the cable 22 as illustrated in FIGS. 7 and 8 may be determined that it is within an allowable range and there is no influence on the performance of the cables 22 (e.g., the signal transmission property of the transmission line 38, the fluid flowability through the feed pipe 36, the light propagation property of the optical fiber 42, or the resistance for bending of the sheath 40). On the other hand, the degree of bending of the cable 22 illustrated in FIG. 9 may be determined that it is not allowable and there is some influence on the performance of the cable 22.

The machine learning apparatus 10 learns the state (e.g., normal state or abnormal state) of the cable 22 while the robot 20 performs the predetermined operation. Referring to FIG. 1, the machine learning apparatus 10 includes a learning data acquisition section 12 and a learning section 14. The learning data acquisition section 12 acquires, as a learning data set DS, image data $D_i$ of the cable 22 imaged by the camera 50 while the robot 20 performs the predetermined operation, and data indicating the state S of the cable 22 (hereinafter, referred to as "state data $D_s$") while the robot 20 performs the predetermined operation.

More specifically, the camera 50 images the cable 22 along the visual-line direction VD at a position in the vicinity of the connection between the wrist 32 and the upper arm 30 while the robot 20 performs the predetermined operation. The camera 50 provides the captured image data $D_i$ to the learning data acquisition section 12. The state data $D_s$ of the cable 22 includes e.g. label information such as "normal state" or "abnormal state." The normal state means the state in which the bending of the cable 22 is within an allowable range as illustrated in FIGS. 7 and 8, for example. On the other hand, the abnormal state means the state in which the bending of the cable 22 is outside the allowable range as illustrated in FIG. 9, for example.

Note that, the state data $D_n$ may be only label information of one of the "normal state" and the "abnormal state," or may include both label information of the "normal state" and the "abnormal state." Further, as the label information of the "normal state," a plurality of pieces of label information such as a "brand-new condition" and a "used condition" may be set.

Further, as the label information of the "abnormal state," a plurality of pieces of label information such as "abnormal state level 1," "abnormal state level 2," and "abnormal state level 3," may be set depending on the seriousness of the abnormal state.

The state data $D_s$ (i.e., the label information) of the cable 22 is determined by an operator. For example, the operator confirms the state S (the normal state or the abnormal state) of the cable 22 by visually observing the image data $D_i$ captured by the camera 50, and inputs the state data $D_s$ to the learning data acquisition section 12. The learning data acquisition section 12 acquires the image data $D_i$ acquired from the camera 50 and the state data $D_s$ determined by the operator, as the learning data set DS.

The learning section 14 generates a learning model (function) LM representing a correlation between the image data $D_i$ and the state S of the cable 22, using the learning data set DS of the image data $D_i$ and the state data $D_s$. For example, the learning section 14 generates the learning model LM by performing supervised learning. In this case, the robot 20 repeatedly tries to perform the predetermined operation, and the learning data acquisition section 12 repeatedly acquires the learning data set DS as teacher data every time the robot 20 performs the predetermined operation.

The learning section 14 learns the learning model LM by identifying features implying the correlation between the image data $D_i$ (e.g., image data of the cables 22 illustrated in FIGS. 7 to 9) and the state data $D_s$ (label information such as the normal state or the abnormal state) acquired as the teacher data. As such supervised learning, an algorithm such as Support Vector Machine (SVM) or Gaussian Mixture Model (GMM) can be employed.

The flow of the learning cycle executed by the machine learning apparatus 10 will be described below with reference to FIG. 10. In step S1, the robot 20 performs the predetermined operation, and the camera 50 images the cable 22 while the robot 20 performs the predetermined operation. As an example, the camera 50 images the cable 22 only once at a time point $\tau_1$ at which the wrist 32 is arranged at the first reference position illustrated in FIGS. 7 to 9 relative to the upper arm 30, while the robot 20 performs the predetermined operation.

As another example, the camera 50 may continuously images the cable 22 (i.e., captures a moving image) while the robot 20 performs the predetermined operation. In this case, the camera 50 images the cable 22 at each time point $\tau_n$ at which the wrist 32 is arranged relative to the upper arm 30 at an n-th reference position (n=1, 2, 3, ... ) at which the axis $A_1$ of the wrist 32 is inclined with respect to the axis $A_2$ of the upper arm 30 by a predetermined angle $\theta_n$.

In step S2, the learning data acquisition section 12 acquires the learning data set DS. More specifically, the learning data acquisition section 12 acquires from the camera 50 image data $D_i$ of the cable 22 imaged by the camera 50 while the robot 20 performs the predetermined operation in step S1.

Further, the learning data acquisition section 12 acquires the label information of the normal state or the label information of the abnormal state, as the data indicating the state S (state data $D_s$) of the cable 22 during execution of step S1. More specifically, the operator confirms whether the cable 22 is in the normal state or the abnormal state by visually observing the image data $D_i$ of the cable 22 imaged by the camera 50.

The operator then operates the input device of the machine learning apparatus 10 so as to input the label information of the normal state or the label information of the abnormal state, as the state data $D_s$. The learning data acquisition section 12 acquires the input label information of the normal state or the input label information of the abnormal state. In this manner, the learning data acquisition section 12 acquires the learning data set DS of the image data $D_i$ and the state data $D_s$ of the cable 22, and stores them in the storage in association with each other.

In step S3, the learning section 14 generates the learning model LM representing the correlation between the image data $D_i$ and the state S, using the learning data set DS acquired in step S2. More specifically, the learning section 14 learns the learning model LM by executing the supervised learning algorithm (e.g., SVM or GMM). Then, the flow returns to step S1.

By executing such a learning cycle, learning of the learning model LM is advanced and guided to an optimum solution. The operator executes the learning cycle illustrated in FIG. 10 for a plurality of robots 20. This makes it possible to acquire a larger number of learning data sets DS, and, in turn, to advance learning of the learning model LM at a higher level. According to this embodiment, it is possible to easily and accurately obtain a model quantitatively representing the correlation between the image data $D_i$ and the state S of the cable 22.

As another function of the machine learning apparatus 10, in step S2, the learning data acquisition section 12 may further acquire, as the learning data set DS, data of a type (a first type, a second type, ... an n-th type) of cable 22 or data of a type of robot 20. The data of the type of cable 22 includes e.g. information for identifying the type of cable 22, information for identifying the type of wire members used (the feed pipe 36, the transmission lines 38, and the optical fiber 42), the numbers of the wire members, information indicating the arrangement of the wire members in the sheath 40, the material of the sheath 40, and information of the positions of the binding wires for binding the wire members at predetermined intervals in the sheath 40.

The information for identifying the type of cable 22 may be e.g. character information such as "n-th Type," or a product number assigned to each cable by a cable manufacturer. The information for identifying the types of wire members may be e.g. character information such as "Feed Pipe," "Transmission Line," or "Optical Fiber."

The information indicating the arrangement of the wire members may be e.g. character information such as "Random Arrangement" or "Concentric Arrangement." The material of the sheath 40 may be represented by e.g. character information such as "Resin" or "Rubber," or a product number assigned by a manufacturer of the material of the sheath 40. The information of the positions of binding wires may be e.g. the average distance between two binding wires, or the number of binding wires.

The data of the type of robot 20 includes e.g. information for identifying the type of robot 20, the number of cables 22 laid, and information of the fixing positions of the restraint tools 34 in the robot 20. The information for identifying the type of robot 20 may be e.g. character information such as "n-th Type," or a product number assigned to each robot by a robot manufacturer.

As an example, in step S2, the operator inputs data $D_t$ of the type of cable 22 or robot 20 by operating the input device of the machine learning apparatus 10. In this manner, the learning data acquisition section 12 acquires, as the learning data set DS, the data $D_t$ of the type, in addition to the image data $D_i$ and the state data $D_s$. In step S3, the learning section 14 generates the learning model LM by adding the relationship between the image data $D_i$ and the data $D_t$ of the type to the correlation between the image data $D_i$ and the state data $D_s$.

The degree of bending of the cable 22 while the robot 20 performs the predetermined operation may vary depending on the type of the cable 22. For example, the larger the number of wire members laid in the sheath 40, or the lower the flexibility of the material of the sheath 40, the harder the cable 22 can be bent.

Further, the degree of bending of the cable 22 while the robot 20 performs the predetermined operation may vary depending on the type of robot 20. For example, the fixing positions of the restraint tools 34 vary for each type of robot 20, as a result of which, the degree of bending of the cable 22 during the predetermined operation may vary.

In this manner, there may be correlation between degree of bending of the cable 22 and the type of cable 22 or robot 20. Therefore, generating the learning model LM by taking the relationship between the image data $D_i$ and the type of cable 22 or robot 20 into consideration makes it possible to obtain the learning model LM adapted to the type of cable 22 or robot 20.

As still another function of the machine learning apparatus 10, in step S2, the learning data acquisition section 12 may further acquire, as the learning data set DS, data of the position and orientation of the robot 20 (hereinafter, referred to as "position data $D_p$") while the robot 20 performs the predetermined operation in step S, in addition to the image data $D_i$ and the state data $D_s$.

As an example, if the camera 50 images the cable 22 only once at the time point $\tau_1$ in step S1, the learning data acquisition section 12 acquires position data $D_p$ of the robot 20 at the time point $\tau_1$. As another example, if the camera 50 continuously images (captures the moving image of) the cable 22 at time points $\tau_n$ (n=1, 2, 3, . . . ) in step S1, the learning data acquisition section 12 sequentially acquires position data $D_p$ of the robot 20 at each time point $\tau_n$.

The position data $D_p$ of the robot 20 can be obtained from the rotation angle θ of each servomotor built in the robot 20. In this case, each servomotor of the robot 20 is equipped with a sensor (e.g., an encoder or a Hall element) that detects the rotation angle θ during image capture by the camera 50. As the position data $D_p$ of the robot 20, the rotation angle θ may be used. In step S3, the learning section 14 generates the learning model LM by adding the relationship between the image data $D_i$ and the position and orientation of the robot 20 to the correlation between the image data $D_i$ and the state data $D_s$.

The degree of bending of the cable 22 while the robot 20 performs the predetermined operation may vary depending on the position and orientation of the robot 20 (e.g., the angle of the wrist 32 with respect to the upper arm 30). In other words, there may be correlation between the degree of bending of the cable 22 and the position and orientation of the robot 20. Therefore, generating the learning model LM by taking the relationship between the image data $D_i$ and the position and orientation of the robot 20 into consideration makes it possible to obtain the learning model LM adapted to the position and orientation of the robot 20.

As still another function of the machine learning apparatus 10, in step S2, the learning data acquisition section 12 may further acquire, as the learning data set DS, an ambient temperature T while the robot 20 performs the predetermined operation in step S1. In this case, a sensor (temperature sensor) that detects the ambient temperature T is provided.

In step S3, the learning section 14 generates the learning model LM by adding the relationship between the image data $D_i$ and the ambient temperature T to the correlation between the image data $D_i$ and the state data $D_s$. There may be a correlation between the degree of bending of the cable 22 and the ambient temperature T while the robot 20 performs the predetermined operation.

More specifically, depending on the material of the sheath 40, the higher the ambient temperature T, the higher the flexibility of the sheath 40, and then the easier the cable 22 can be bent. On the other hand, the lower the ambient temperature T, the lower the flexibility of the sheath 40, and then the harder the cable 22 can be bent. Therefore, generating the learning model LM by taking the relationship between the image data $D_i$ and the ambient temperature T into consideration makes it possible to obtain the learning model LM adapted to the ambient temperature T.

As still another function of the machine learning apparatus 10, in step S2, the learning data acquisition section 12 may further acquire, as the learning data set DS, an electrical current A through the transmission line 38 or a resistance R of the transmission line 38 while the robot 20 performs the predetermined operation in step S1. In this case, a sensor (e.g., an ammeter or an ohmmeter) that detects the electrical current A or the resistance R of the transmission line 38 during the predetermined operation is provided.

In step S3, the learning section 14 generates the learning model LM by adding the relationship between the image data $D_i$ and the current A or the resistance R to the correlation between the image data $D_i$ and the state data $D_s$. The electrical current A or the resistance R may vary depending on the degree of bending of the cable 22 while the robot 20 performs the predetermined operation. For example, if the degree of bending of the cable 22 falls outside the allowable range, the transmission line 38 may partially break, and the resistance R of the transmission line 38 may increase while the electrical current A of the transmission line 38 may decrease.

In this manner, there may be a correlation between the degree of bending of the cable 22 and the electrical current A or the resistance R. Therefore, generating the learning model LM by taking the relationship between the image data $D_i$ and the current A or the resistance R into consideration makes it possible to obtain the learning model LM adapted to the current A or the resistance R.

As still another function of the machine learning apparatus 10, if the cable 22A illustrated in FIG. 3 or the cable 22B illustrated in FIG. 4 is used, in step S2, the learning data acquisition section 12 may further acquire, as the learning data set DS, a pressure P of the fluid in the feed pipe 36 while the robot 20 performs the predetermined operation in step S1. In this case, a sensor (e.g., a pressure gauge) that detects the pressure P during the predetermined operation is provided.

In step S3, the learning section 14 generates the learning model LM by adding the relationship between the image data $D_i$ and the pressure P to the correlation between the image data $D_i$ and the state data $D_s$. The degree of bending of the cable 22 while the robot 20 performs the predetermined operation may vary depending on the pressure P of the fluid in the feed pipe 36.

More specifically, the higher the pressure P of the fluid in the feed pipe 36, the harder the cable 22 can be bent. In this manner, there may be a correlation between the degree of bending of the cable 22 and the pressure P. Therefore, generating the learning model LM by taking the relationship between the image data $D_i$ and the pressure P into consideration makes it possible to obtain the learning model LM adapted to the pressure P.

As still another function of the machine learning apparatus 10, if the cable 22C illustrated in FIG. 5 is used, in step S2, the learning data acquisition section 12 may further acquire, as the learning data set DS, an optical characteristic OP of light (e.g., a laser beam) propagating through the optical fiber 42 while the robot 20 performs the predetermined operation in step S1. The optical characteristic OP may include e.g. the intensity, the power, or the intensity distribution of the light (or return light of the light) propagating through the optical fiber 42. In this case, a sensor (e.g., an optical power meter or a beam profiler) that detects the optical characteristic OP during the predetermined operation is provided.

In step S3, the learning section 14 generates the learning model LM by adding the relationship between the image data $D_i$ and the optical characteristic OP to the correlation between the image data $D_i$ and the state data $D_s$. The optical characteristic OP may vary depending on the degree of bending of the cable 22 while the robot 20 performs the predetermined operation. For example, when the degree of bending of the cable 22 falls outside the allowable range, leakage light in the bent portion of the cable 22 may increase, whereby the intensity or the power of light (or return light) may decrease.

In this manner, there may be a correlation between the degree of bending of the cable 22 and the optical characteristic OP. Therefore, generating the learning model LM by taking the relationship between the image data $D_i$ and the optical characteristic OP into consideration makes it possible to obtain the learning model LM adapted to the optical characteristic OP.

Figure 11:
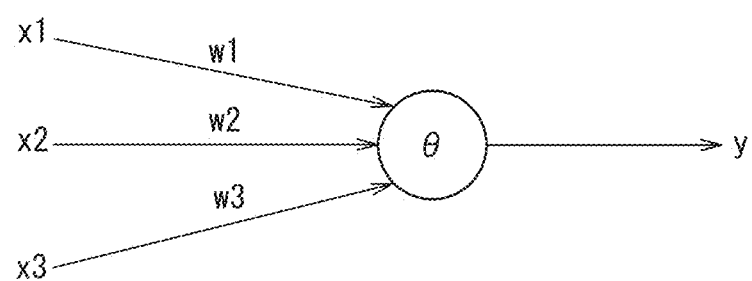
FIG. 11 schematically illustrates a model of a neuron.
Figure 12:
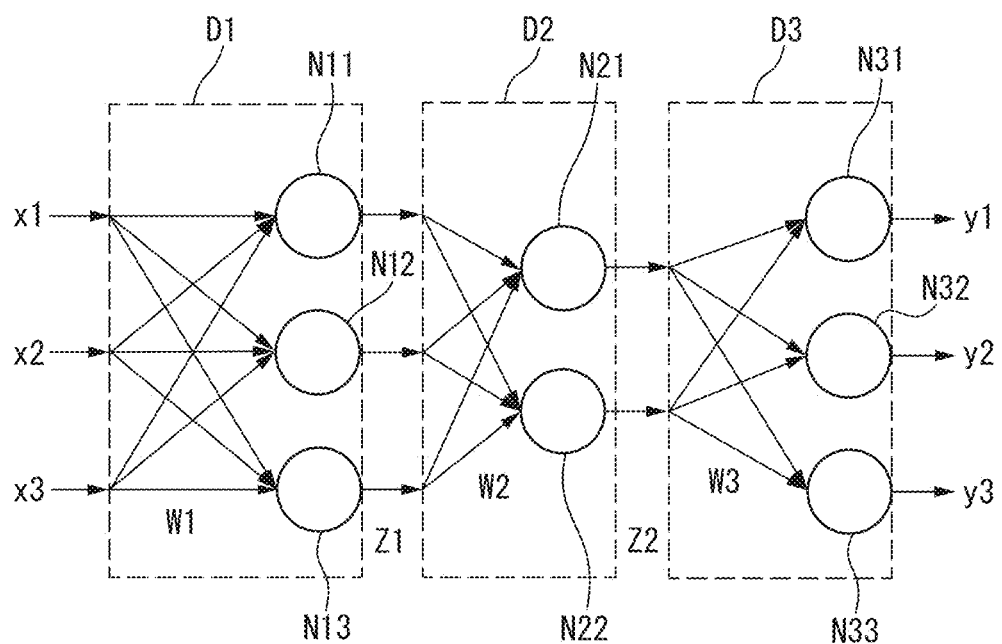
FIG. 12 schematically illustrates a model of a multilayer neural network.

The learning algorithm executed by the learning section 14 is not limited to the supervised learning, and a known learning algorithm such as unsupervised learning, reinforcement learning, or a neural network can be employed as the machine learning. As an example, FIG. 11 schematically illustrates a model of a neuron. FIG. 12 schematically illustrates a model of a three-layer neural network formed by combining neurons as illustrated in FIG. 11. The neural network can be implemented as e.g. an arithmetic device or a storage device imitating a model of a neuron.

The neuron illustrated in FIG. 11 outputs a result y in response to inputs x (inputs x1 to x3 are defined as an example in FIG. 11). The individual inputs x (x1, x2, and x3) are respectively multiplied by weights w (w1, w2, and w3). The relationship between the inputs x and the result y can be expressed as the following equation.

[Equation 1]

$$y = f_k(\Sigma_{i=1}^{n} x_i w_i - \theta) \qquad (1)$$

The inputs x, the result y, and the weights w are all vectors. In equation (1), $\theta$ is the bias, and $f_k$ is the activation function.

In the three-layer neural network illustrated in FIG. 12, inputs x (inputs x1 to x3 are defined as an example in FIG. 11) are input from the left side, and results y (results y1 to y3 are defined as an example in FIG. 11) are output from the right side. In the example illustrated in FIG. 11, each of the inputs x1, x2, and x3 is multiplied by a corresponding weight (collectively denoted by W1), and all the individual inputs x1, x2, and x3 are input to three neurons N11, N12, and N13.

In FIG. 12, the output of each of the neurons N1 to N13 is collectively denoted by Z1. Z1 can be considered as a feature vector obtained by extracting a feature amount of an input vector. In the example illustrated in FIG. 12, each feature vector Z1 is multiplied by a corresponding weight (collectively denoted by W2), and all the individual feature vectors Z1 are input to two neurons N21 and N22. The feature vectors Z1 represent features between the weight W1 and the weight W2.

In FIG. 12, the output of each of the neurons N21 and N22 is collectively denoted by Z2. Z2 can be considered as a feature vector obtained by extracting a feature amount of the feature vector Z1. In the example illustrated in FIG. 12, each feature vector Z2 is multiplied by a corresponding weight (collectively denoted by W3), and all the individual feature vectors Z2 are input to three neurons N31, N32, and N33.

The feature vectors Z2 represent features between the weight W2 and the weight W3. Lastly, the neurons N31 to N33 output results y1 to y3, respectively. The machine learning apparatus 10 can learn the learning model LM by performing multilayer structure calculation in accordance with the above-mentioned neural network, using the learning data set DS as input.

The configuration of the machine learning apparatus 10 can be described as a machine learning method (or software) executed by a processor of a computer. In the machine learning method, the processor acquires, as the learning data set DS, the image data $D_i$ of the cable 22 imaged by the camera 50 while the robot 20 performs the predetermined operation, and the data $D_s$ indicating the state S of the cable 22 while the robot 20 performs the predetermined operation, and generates the learning model LM representing the correlation between the image data $D_i$ and the state S of the cable 22, using the learning data set DS.

Figure 13:
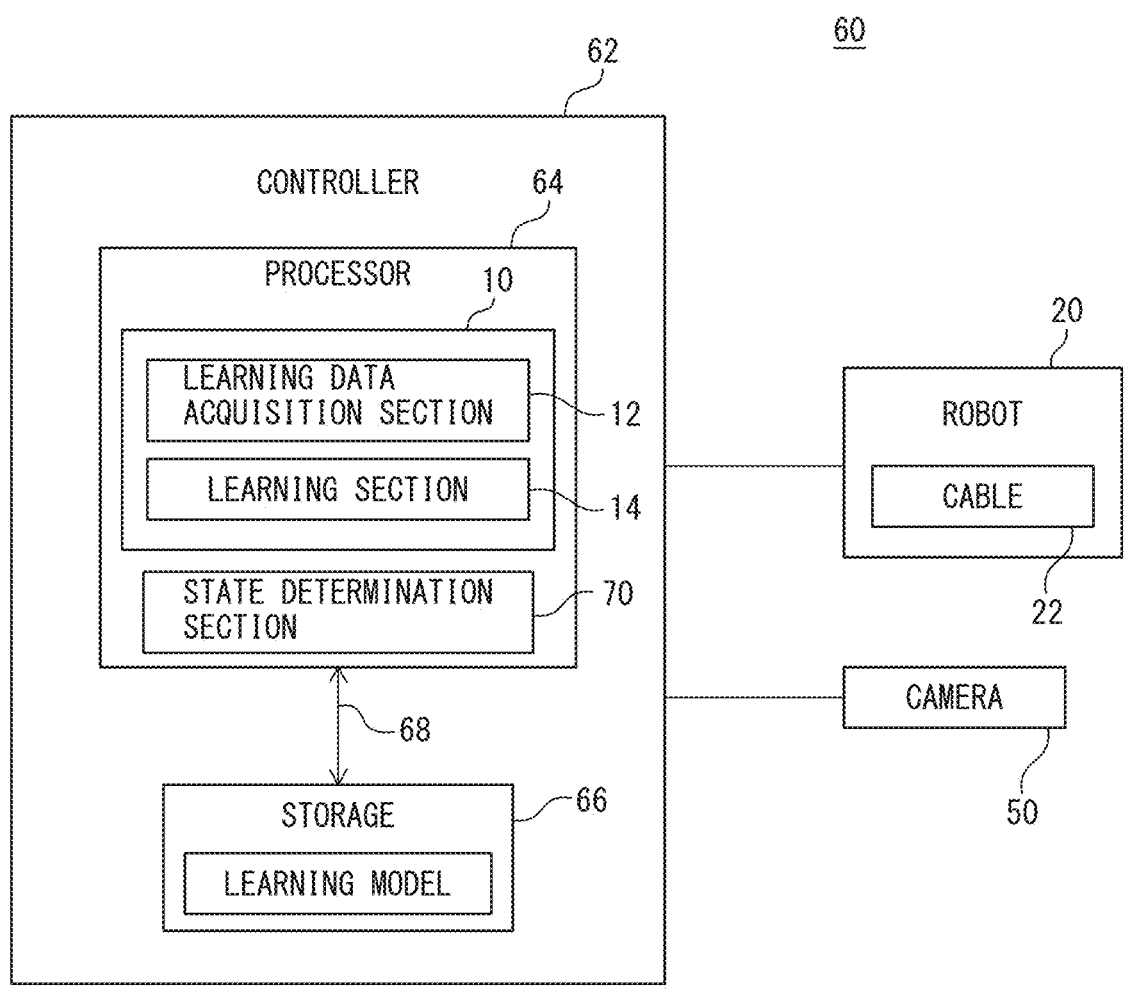
FIG. 13 is a block diagram illustrating a robot system according to one embodiment.

Next, with reference to FIG. 13, a robot system 60 according to an embodiment will be described. The robot system 60 includes the robot 20, the camera 50, and a controller 62. The controller 62 includes a processor 64 and a storage 66. The processor 64 and the storage 66 are communicably connected to each other via a bus 68. The processor 64 includes e.g. a CPU or a GPU, and executes various arithmetic processes while communicating with the storage 66. The controller 62 may be implemented as a computer including an input device (e.g., a keyboard, a mouse, or a touch panel) and a display device (e.g., an LCD or an organic EL display).

In this embodiment, the machine learning apparatus 10 is installed in the controller 62 as hardware or software, and the processor 64 executes various arithmetic processes for carrying out the function of the machine learning apparatus 10. Thus, in this embodiment, the processor 64 functions as the learning data acquisition section 12 and the learning section 14.

The storage 66 includes e.g. a ROM and a RAM, and pre-stores the learning model LM learned by the machine learning apparatus 10. The robot system 60 according to this embodiment is installed in e.g. a plant for manufacturing the robot system 60, or a plant where the robot 20 carries out an actual work (e.g., welding, workpiece handling, machining, or painting).

Figure 14:
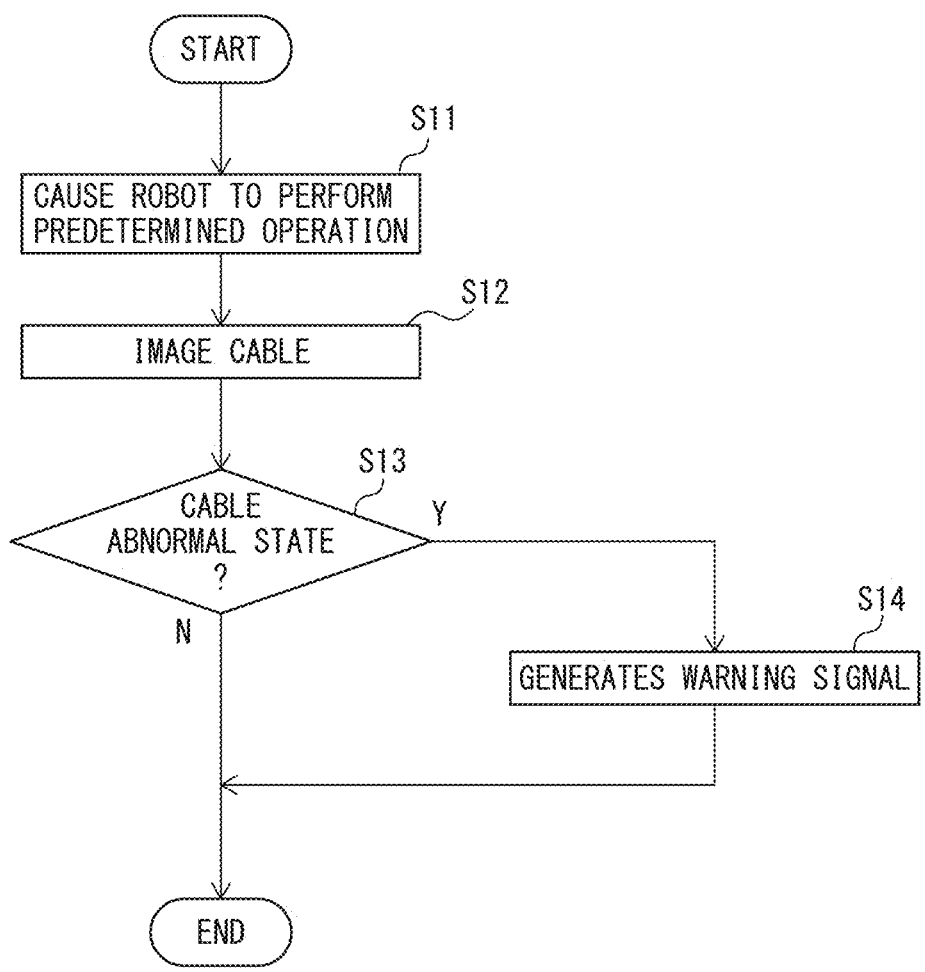
FIG. 14 is a flowchart illustrating an exemplary operation sequence of the robot system illustrated in FIG. 13.

The operation of the robot system 60 will be described below with reference to FIG. 14. The flow illustrated in FIG. 14 is started when the processor 64 receives an operation-start command from an operator, a host controller, or a robot program. In step S11, the processor 64 causes the robot 20 to perform the predetermined operation.

As an example of the predetermined operation, the processor 64 moves each movable element (the rotating body 26, the lower arm 28, the upper arm 30, and the wrist 32) in accordance with a predetermined robot program so as to cause the robot 20 to perform a series of operations, in order to cause the robot 20 to carry out a work (e.g., welding, workpiece handling, machining, or painting). Alternatively, as the predetermined operation, the processor 64 causes the robot 20 to rotate the first element (wrist 32) with respect to the second element (upper arm 30) of the robot 20 between the first position and the second position that are predetermined.

The predetermined operation performed by the robot 20 in step S11 is substantially the same as that performed by the robot 20 in the above-mentioned step S1 for learning. For example, in this step S11, the processor 64 may operate the robot 20 in accordance with the same robot program as that used to operate the robot 20 in the above-mentioned step S1.

However, the predetermined operation performed in step S11 is not limited to an operation under completely the same conditions (e.g., the type of end effector, the position and orientation of the robot 20, and the movement path of the robot 20) as in step S1, and may be an operation, at least one condition of which is different from that in step S1 as long as the degree of bending of the cable 22 is equal.

In step S12, the processor 64 causes the camera 50 to image the cable 22 while the robot 20 performs the predetermined operation. In this step S12, the processor 64 images the same position of the cable 22 along the same visual-line direction VD at the same timing as the above-mentioned step S1 in which the camera 50 has imaged the cable 22.

As an example, if the camera 50 has imaged the cable 22 only once at the time point $\tau_1$ in the above-mentioned step S1, in step S12, the processor 64 causes the camera 50 to image the cable 22 along the visual-line direction VD at the position in the vicinity of the connection between the wrist 32 and the upper arm 30 at the time point $\tau_1$ at which the wrist 32 is arranged at the first reference position relative to the upper arm 30 during execution of step S11.

As another example, if the camera 50 has continuously imaged the cable 22 at the time points $\tau_n$ (n=1, 2, 3, ... ) in the above-mentioned step S1, in step S12, the processor 64 causes the camera 50 to image the cable 22 along the visual-line direction VD at the position in the vicinity of the connection between the wrist 32 and the upper arm 30 at each time point $\tau_n$ at which the wrist 32 is arranged at the n-th reference position relative to the upper arm 30 during execution of step S11. The camera 50 provides captured image data $D_i'$ of the cable 22 to the processor 64.

In step S13, the processor 64 determines the state S of the cable 22, based on the learning model LM. More specifically, the processor 64 inputs the image data $D_i'$ of the cable 22 acquired in step S12 to the learning model LM stored in the storage 66. Then, the learning model LM estimates and outputs state data $D_3$ (label information such as the "normal state" or the "abnormal state") correlated with the input image data $D_i'$. In this way, the processor 64 can determine the state S of the cable 22 from the acquired image data $D_i'$.

The processor 64 determines NO when the state S of the cable 22 is not abnormal (or is normal), and completes the operation started in step S11 to end the flow illustrated in FIG. 14. On the other hand, the processor 64 determines YES when the state S of the cable 22 is abnormal (or is not normal), and proceeds to step S14. Thus, in this embodiment, the processor 64 functions as a state determination section 70 (FIG. 13) configured to determine the state S of the cable 22.

In step S14, the processor 64 generates a warning signal. For example, the processor 64 generates an audio or image signal indicating that "Abnormality may occur in state of cable," and outputs it via a loudspeaker or a display (not illustrated) provided in the controller 62. The processor 64 then ends the flow illustrated in FIG. 14.

Figure 10:
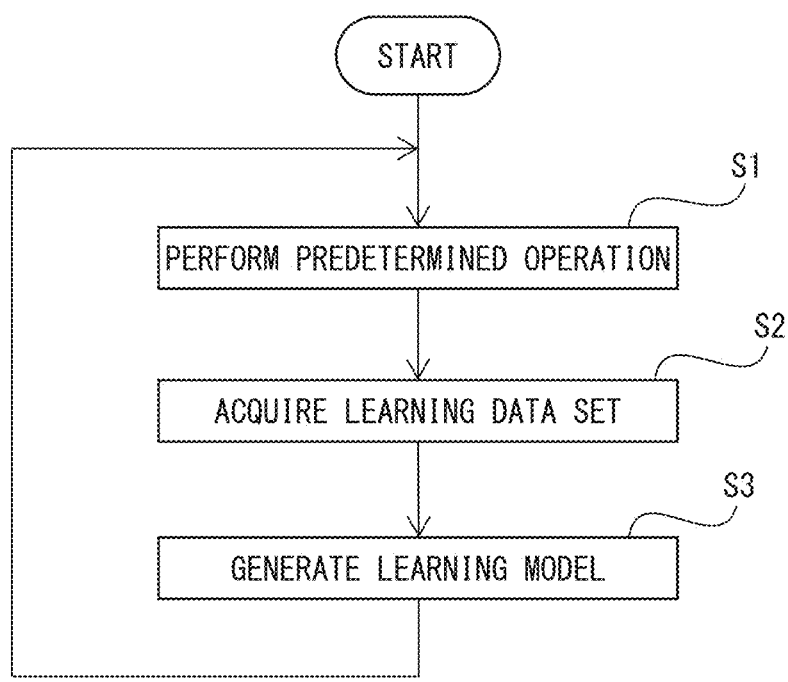
FIG. 10 is a flowchart illustrating an exemplary learning cycle executed by the machine learning apparatus illustrated in FIG. 1.

Note that, if the data $D_t$ of the type of cable 22 or robot 20 is further acquired as the learning data set DS to learn the learning model LM in the learning cycle illustrated in FIG. 10, the operator may input data $D_t'$ of the type of robot 20 or cable 22 of the robot system 60 by operating the input device provided in the controller 62, before step S13.

In this case, in step S13, the processor 64 of the robot system 80 inputs to the learning model LM the input data $D_t'$ of the type, as well as the image data $D_i'$ of the cable 22 acquired in step S12. Then, the learning model LM estimates the state data $D_s$ from the image data $D_i'$ and the data $D_t'$ of the type, and determines the state S of the cable 22. According to this configuration, the state S of the cable 22 can be more accurately determined so as to correspond to the data $D_t'$ of the type.

Figure 15:
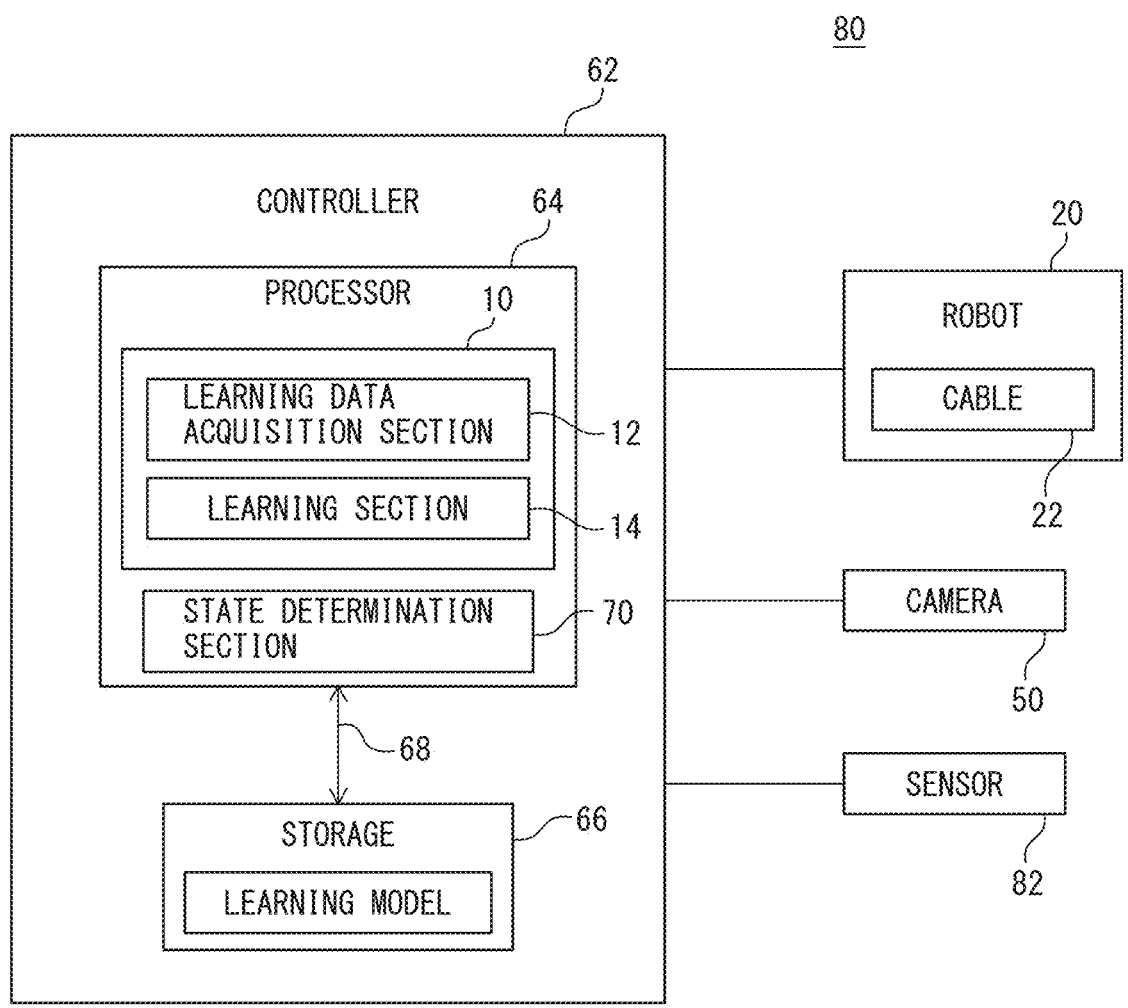
FIG. 15 is a block diagram illustrating a robot system according to another embodiment.

Next, with reference to FIG. 15, a robot system 80 according to another embodiment will be described. The robot system 80 is different from the above-mentioned robot system 60 in that it further includes a sensor 82. As an example, if the position data $D_p$ is further acquired as the learning data set DS to learn the learning model LM in the learning cycle illustrated in FIG. 10, the sensor 82 is e.g. an encoder or a Hall element built in each servomotor of the robot 20 of the robot system 80, and detects a rotation angle θ' of the servomotor as a detected value.

As another example, if the ambient temperature T is further acquired as the learning data set DS to learn the learning model LM in the learning cycle illustrated in FIG. 10, the sensor 82 is e.g. a temperature sensor, and detects an ambient temperature T' around the robot 20 of the robot system 80 as a detected value. As still another example, if the electrical current A or the resistance R of the transmission line 38 is further acquired as the learning data set DS to learn the learning model LM in the learning cycle illustrated in FIG. 10, the sensor 82 is e.g. an ammeter or an ohmmeter, and detects an electrical current A' or a resistance R' of the transmission line 38 of the cable 22 of the robot system 80, as a detected value.

As still another example, if the pressure P of the fluid in the feed pipe 36 is further acquired as the learning data set DS to learn the learning model LM in the learning cycle illustrated in FIG. 10, the sensor 82 is e.g. a pressure gauge, and detects a pressure P' of the fluid in the feed pipe 36 of the cable 22 of the robot system 80, as a detected value.

As still another example, if the optical characteristic OP is further acquired as the learning data set DS to learn the learning model LM in the learning cycle illustrated in FIG. 10, the sensor 82 is e.g. an optical power meter or a beam profiler, and detects an optical characteristic OP' of light propagating through the optical fiber 42 of the cable 22 of the robot system 80, as a detected value.

Figure 16:
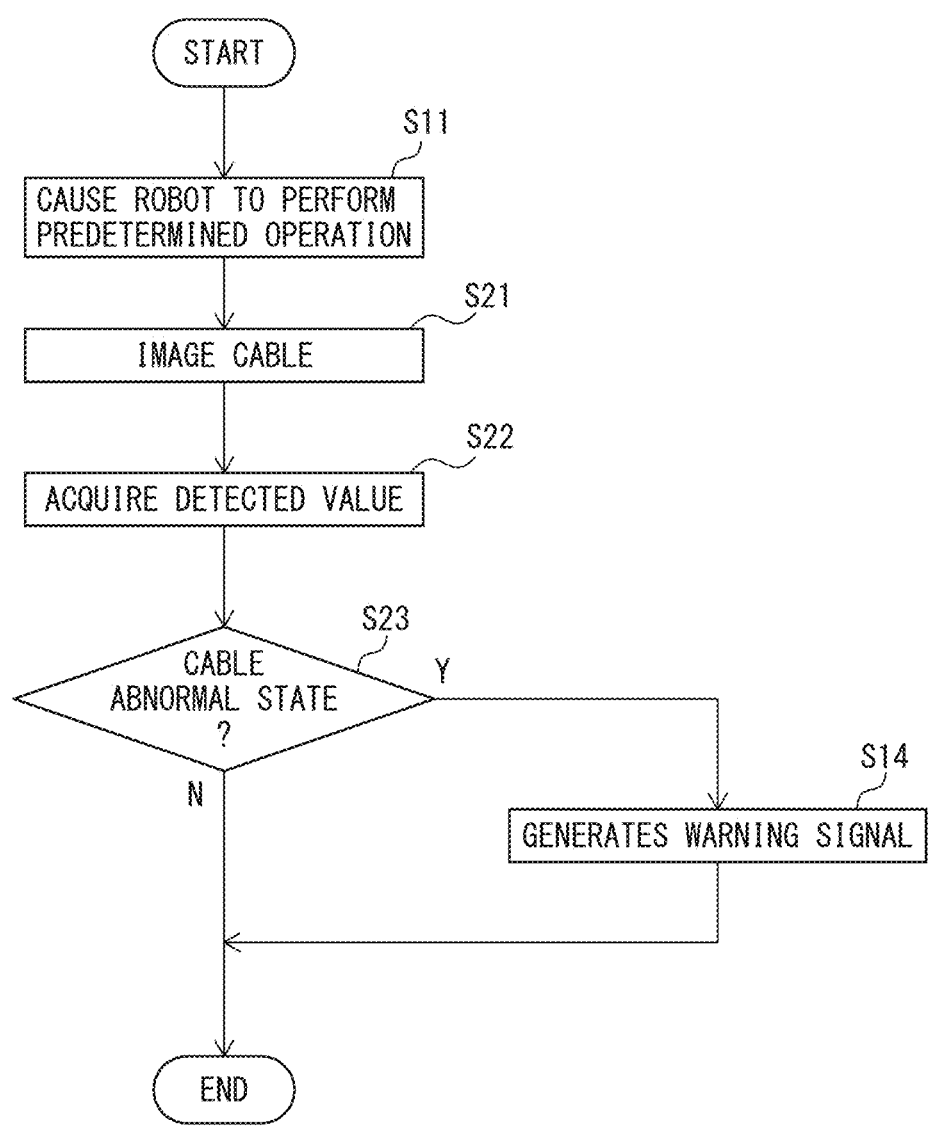
FIG. 16 is a flowchart illustrating an exemplary operation sequence of the robot system illustrated in FIG. 15.

The operation of the robot system 80 will be described below with reference to FIG. 16. Note that, in the flow illustrated in FIG. 16, processes similar as the flow illustrated in FIG. 14 are assigned the same step number, and repetitive descriptions thereof will be omitted. In step S21, the processor 64 of the robot system 80 causes the camera 50 to image the cable 22 while the robot 20 performs the predetermined operation in step S11. In this step S21, the processor 64 causes the camera 50 to image the same position of the cable 22 along the same visual-line direction VD as the above-mentioned step S1 in which the camera 50 has images the cable 22.

As an example, if the position data $D_p$ is further acquired to learn the learning model LM in the learning cycle illustrated in FIG. 10, the processor 64 causes the camera 50 to image the cable 22 at an arbitrary timing while the robot 20 performs the predetermined operation in step S11. On the other hand, if the position data $D_p$ is not acquired in the learning cycle illustrated in FIG. 10, the processor 64 causes the camera 50 to image the cable 22 at the same timing as step S1 in the learning stage in which the camera 50 has imaged the cable 22, similarly to the above-mentioned step S12.

In step S22, the processor 64 of the robot system 80 operates the sensor 82 to acquire the detected value while the robot 20 performs the predetermined operation in step S11. As an example, if the position data $D_p$ is further acquired to learn the learning model LM in the learning cycle illustrated in FIG. 10, the sensor 82 detects the rotation angle θ' as the detected value at the time point at which the camera 50 images the cable 22 in step S21. The processor 64 acquires position data $D_p'$ of the robot 20 of the robot system 80 from the rotation angle θ'.

As another example, if the ambient temperature T is further acquired to learn the learning model LM in the learning cycle illustrated in FIG. 10, the sensor 82 detects the ambient temperature T' as the detected value during (or before or after) execution of step S11. As still another example, if the electrical current A or the resistance R is further acquired to learn the learning model LM in the learning cycle illustrated in FIG. 10, the sensor 82 detects the current A' or the resistance R' as the detected value during execution of step S11 (e.g., at the time point at which the camera 50 images the cable 22 in step S21).

As still another example, if the pressure P is further acquired to learn the learning model LM in the learning cycle illustrated in FIG. 10, the sensor 82 detects the pressure P' as the detected value during execution of step S11 (e.g., at the time point at which the camera 50 images the cable 22 in step S12). As still another example, if the optical characteristic OP is further acquired to learn the learning model LM in the learning cycle illustrated in FIG. 10, the sensor 82 detects the optical characteristic OP' as the detected value.

In step S23, the processor 64 of the robot system 80 determines the state S of the cable 22, based on the learning model LM. As an example, if the position data $D_p'$ is acquired in the above-mentioned step S22, the processor 64 inputs the image data $D_i'$ of the cable 22 acquired in step S21, and the position data $D_p'$ acquired in step S22, to the learning model LM stored in the storage 66.

Then, the learning model LM estimates the state data $D_s$ from the image data $D_i'$ and the position data $D_p'$, and determines the state S of the cable 22. In this manner, if the position data $D_p$ is acquired as the learning data set DS to learn the learning model LM, the state S of the cable 22 can be determined by inputting image data $D_i'$ imaged at the arbitrary timing in step S21 to the learning model LM. Further, the state S of the cable 22 can be more accurately determined so as to correspond to the position and orientation of the robot 20.

As another example, if the detected value of the ambient temperature T', the current A', the resistance R', the pressure P', or the optical characteristic OP' is acquired in the above-mentioned step S22, the processor 64 inputs to the learning model LM the detected value T', A', R', P' or OP' acquired in step S22, together with the image data $D_i'$ of the cable 22 acquired in step S21.

Then, the learning model LM estimates the state data $D_s$ from the image data $D_i'$ and the detected value T', A', R', P' or OP', and determines the state S of the cable 22. According to this configuration, the state S of the cable 22 can be more accurately determined so as to correspond to the ambient temperature T', the current A', the resistance R', the pressure P', or the optical characteristic OP'.

As described above, in the robot systems 60 and 80, the processor 64 determines the state S of the cable 22 while the robot 20 performs the predetermined operation, based on the learning model LM learned by the machine learning apparatus 10. According to this configuration, it is possible to automatically and accurately determine whether an abnormality has occurred in the state S of the cable 22 in a worksite such as a plant.

Note that, in the above-mentioned step S23, the processor 64 may further determine whether the current A' or the resistance R', the pressure P', or the optical characteristic OP' detected by the sensor 82 falls within a predetermined allowable range, in addition to the determination of the state S of the cable 22 by the learning model LM.

When the current A' or the resistance R', the pressure P', or the optical characteristic OP' falls outside of the allowable range, the processor 64 may determine YES in step S23 and proceed to step S14 even if the learning model LM determines that the state S of the cable 22 is not abnormal (or is normal). According to this configuration, the processor 64 can more reliably detect an abnormality in the cable 22 from the detected value such as the current A' or the resistance R', the pressure P', or the optical characteristic OP', in addition to the determination of the state S by the learning model LM.

Figure 17:
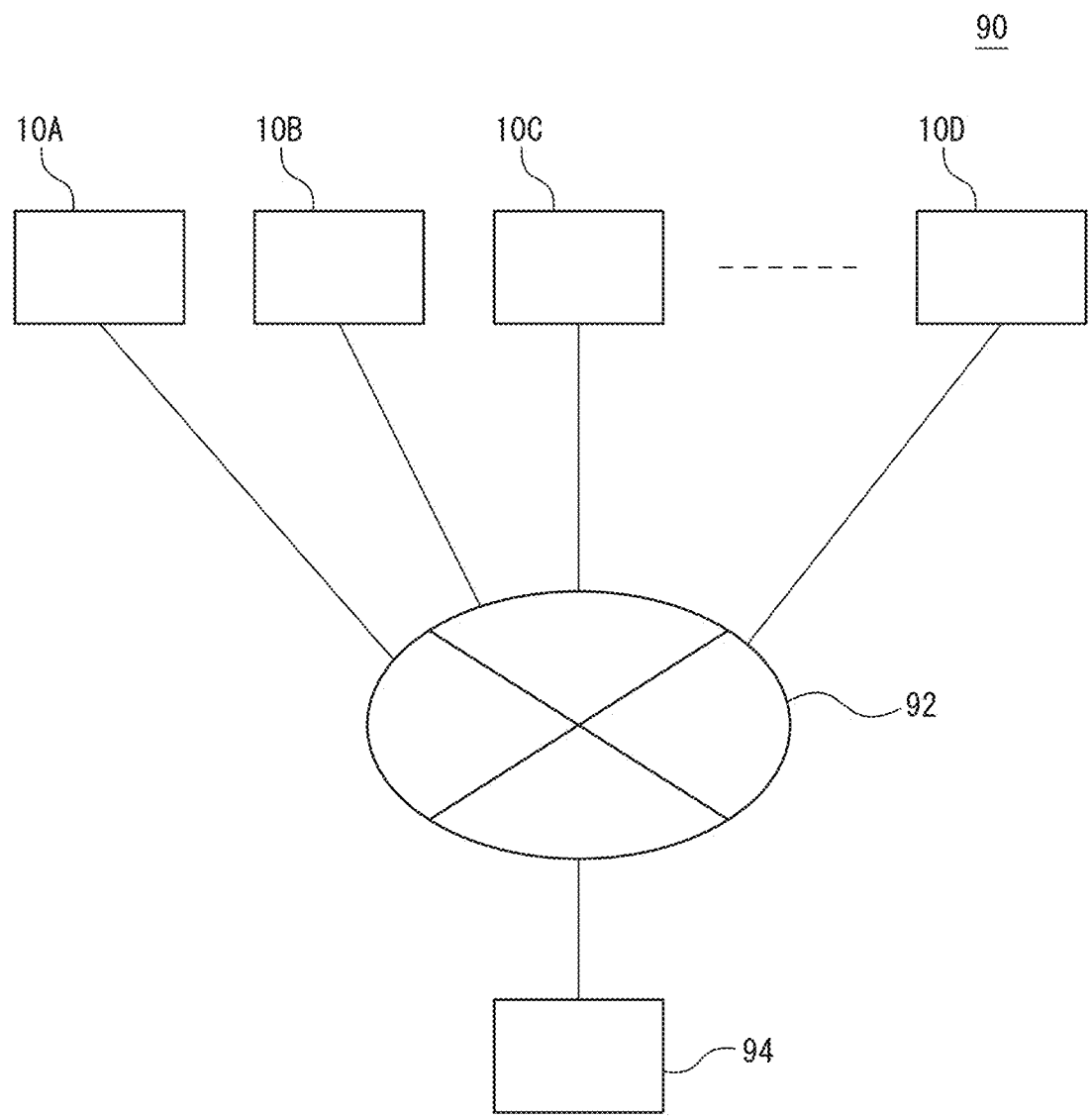
FIG. 17 is a block diagram illustrating a network system according to one embodiment.

Next, with reference to FIG. 17, a network system 90 according to an embodiment will be described. The network system 90 includes a plurality of machine learning apparatuses 10A, 10B, 10C and 10D, a storage device 94, and a network 92 that communicably connects the machine learning apparatuses 10A, 10B, 10C and 10D to the storage device 94.

Each of the machine learning apparatuses 10A, 10B, 10C and 10D has a configuration similar as the above-mentioned machine learning apparatus 10. The machine learning apparatuses 10A, 10B, 10C and 10D may be installed in different plants, or may be installed on different production lines in the same plant. The storage device 94 includes e.g. a server, and can store data. The network 92 is e.g. a LAN or the Internet, and bidirectionally communicates data between the storage device 94 and each of the machine learning apparatuses 10A, 10B, 10C and 10D.

Each of the machine learning apparatuses 10A, 10B, 10C and 10D sends the learning data set DS acquired by the learning data acquisition section 12 to the storage device 94 via the network 92. The storage device 94 stores the learning data set DS received from each of the machine learning apparatuses 10A, 10B, 10C and 10D.

Further, each of the machine learning apparatuses 10A, 10B, 10C and 10D acquires the learning data set DS stored in the storage device 94 via the network 92. The learning section 14 of each machine learning apparatuses 10A, 10B, 10C and 10D learns the learning model LM using the learning data set DS acquired from the storage device 94.

According to this embodiment, the learning data sets DS acquired by the plurality of machine learning apparatuses 10A, 10B, 10C and 10D are collected in the storage device 94 to allow sharing of the learning data sets DS among the machine learning apparatuses 10A, 10B, 10C and 10D. According to this configuration, the machine learning apparatuses 10A, 10B, 10C and 10D can advance learning of the learning model LM using a larger number of learning data sets DS, and whereby can effectively advance the learning of the learning model LM.

Note that the learning data acquisition section 12 may further acquire, as the learning data set DS, at least two (e.g., all) of the position data $D_p$, the data $D_t$ of the type, the ambient temperature T, the electrical current A or the resistance R, the pressure P, and the optical characteristic OP. The learning section 14 may generate the learning model LM by adding, to the correlation between the image data $D_i$ and the state data $D_s$, the relationships between the image data $D_i$ and at least two of the position data $D_p$, the data $D_t$ concerning the type, the ambient temperature T, the current A or the resistance R, the pressure P, and the optical characteristic OP.

Further, in the above-mentioned step S2, the operator may detect the electrical current A or the resistance R, the pressure P, or the optical characteristic OP using the sensor, confirm the state S of the cable 22 based on the current A or the resistance R, the pressure P, or the optical characteristic OP, and input the state data $D_s$ to the learning data acquisition section 12. In this case, the machine learning apparatus 10 may further include a detected value determination section configured to determine whether the electrical current A or the resistance R, the pressure P, or the optical characteristic OP falls within a predetermined allowable range.

Further, if the camera 50 continuously images the cable 22 (i.e., captures moving video) over a predetermined period Δ and acquire a group of image data $D_{i\_1}$, $D_{i\_2}$, ... $D_{i\_n}$ ("n" is a positive integer) in the above-mentioned step S1, in step S2, the operator may assign one piece of state data $D_s$ (i.e., single label information) to the captured group of image data $D_{i\_1}$ to $D_{i\_n}$ (i.e., the video during the period Δ), and input to the learning data acquisition section 12.

In this case, the learning data acquisition section 12 acquires the learning data set DS of the group of image data $D_{i\_1}$ to $D_{i\_n}$ and one piece of state data $D_s$ assigned to the group of image data $D_{i\_1}$ to $D_{i\_n}$. Then, the learning section 14 generates the learning model LM representing the correlation between the group of image data $D_{i\_1}$ to $D_{i\_n}$ and the state S of the cable 22, using the learning data set DS of the group of image data $D_{i\_1}$ to $D_{i\_n}$ and the state data $D_s$.

Then, in the above-mentioned step S12 or S21, the camera 50 continuously images the cable 22 (captures its video) over the period Δ at the same timing as in step S1, and acquires a group of image data $D_{i\_1'}$, $D_{i\_2'}$, ... $D_{i\_n'}$ ("n" is a positive integer). Then, in the above-mentioned step S13 or S23, the processor 64 inputs the group of image data $D_{i\_1'}$ to $D_{i\_n'}$ to the learning model LM, and the learning model LM estimates and outputs the state data $D_s$ correlated with the group of image data $D_{i\_1'}$ to $D_{i\_n'}$. According to this configuration, the state S of the cable 22 can be determined based on the video (the group of image data $D_{i\_1'}$ to $D_{i\_n'}$) of the cable 22.

In the above-described embodiments, the camera 50 is arranged so as to image the cable 22 at a position in the vicinity of the connection between the wrist 32 and the upper arm 30. However, the camera 50 may be arranged to image any position of the cable 22, at which the cable 22 is bent while the robot 20 performs the predetermined operation. Further, a plurality of cameras 50 may be provided to image different positions of the cable 22.

The robot 20 is not limited to a vertical multi-articulated robot, but may be a robot of any type such as a horizontal multi-articulated robot, a parallel-link robot, or a loader as long as this robot includes a movable element and a cable. The disclosure has been described above with reference to embodiments, but the above-described embodiments are not intended to limit the invention according to the scope of claims.

The invention claimed is:

1. A machine learning apparatus configured to learn a state of a cable provided at a robot, the apparatus comprising:
a learning data acquisition section configured to acquire, as a learning data set, image data of the cable imaged by a camera while the robot performs a predetermined operation, and data indicating a state of the cable while the robot performs the predetermined operation; and
a learning section configured to generate a learning model representing a correlation between the image data and the state of the cable, using the learning data set.

2. The machine learning apparatus according to claim 1, wherein the learning data acquisition section further acquires, as the learning data set, data of a position and orientation of the robot during the predetermined operation,
wherein the learning section generates the learning model by adding a relationship between the image data and the position and orientation to the correlation.

3. The machine learning apparatus according to claim 1, wherein the learning data acquisition section further acquires, as the learning data set, data of a type of the cable or the robot,
wherein the learning section generates the learning model by adding a relationship between the image data and the type to the correlation.

4. The machine learning apparatus according to claim 1, wherein the learning data acquisition section further acquires, as the learning data set, an ambient temperature during the predetermined operation,
wherein the learning section generates the learning model by adding a relationship between the image data and the ambient temperature to the correlation.

5. The machine learning apparatus according to claim 1, wherein the cable includes a transmission line configured to transmit an electrical signal,
wherein the learning data acquisition section further acquires, as the learning data set, an electrical current through the transmission line or a resistance of the transmission line,
wherein the learning section generates the learning model by adding a relationship between the image data and the current or the resistance to the correlation.

6. The machine learning apparatus according to claim 1, wherein the cable includes a feed pipe configured to feed a fluid,
wherein the learning data acquisition section further acquires, as the learning data set, a pressure of the fluid during the predetermined operation, wherein the learning section generates the learning model by adding a relationship between the image data and the pressure to the correlation.

7. The machine learning apparatus according to claim 1, wherein the cable includes an optical fiber configured to propagate light,
wherein the learning data acquisition section further acquires, as the learning data set, an optical characteristic of the light during the predetermined operation,
wherein the learning section generates the learning model by adding a relationship between the image data and the optical characteristic to the correlation.

8. The machine learning apparatus according to claim 1, configured to sends the learning data set to a storage device, which is communicably connected to the machine learning apparatus via a network, in order to store the learning data set in the storage device.

9. A robot system comprising:
a robot;
the machine learning apparatus according to claim 1;
the camera configured to image the cable while the robot performs the predetermined operation, and provide a captured image to the learning data acquisition section as the image data; and
a state determination section configured to determine the state of the cable while the robot performs the predetermined operation, based on the learning model generated by the learning section.

10. A machine learning method of learning a state of a cable provided at a robot, the method comprising, by a processor:
acquiring, as a learning data set, image data of the cable imaged by a camera while the robot performs a predetermined operation, and data indicating a state of the cable while the robot performs the predetermined operation; and
generating a learning model representing a correlation between the image data and the state of the cable, using the learning data set.

* * * * *